Patented Dec. 20, 1938

2,140,784

UNITED STATES PATENT OFFICE 2,140,784

DIELECTRIC COMPOSITIONS

Edgar C. Britton, Gerald H. Coleman, and Luther F. Berhenke, Midland, Mich., assignors to The Dow Chemical Company, Midland, Mich., a corporation of Michigan No Drawing. Application November 13, 1936, Serial No. 110,578

4 Claims. (Cl. 252—1)

The present invention relates to liquid dielectric compositions which are suitable for use in electrical apparatus and devices, such as transformers, fuses, switches and the like, or for impregnating other materials to increase their dielectric properties, such as in condensers or in the wrappings of insulated wires and coils.

Various organic chemical products have been used or proposed for use for the above mentioned purposes, examples of which are hydrocarbon oils and certain halogenated aliphatic or aromatic hydrocarbons. All of the materials heretofore used are subject to limitations which restrict their field of use, or disqualify them for certain particular uses. For example, hydrocarbon oils have been found to be unsatisfactory because of their flammability, hygroscopic characteristics, and tendency to form sludges and to deteriorate in insulating strength. Partially chlorinated aliphatic hydrocarbons decompose in the presence of light or moisture to give acid products which corrode metallic surfaces contacted therewith, and their use is preferably limited to those cases wherein the presence of small amounts of such acid products is not objectionable. Furthermore, many of these products have relatively high freezing points or low boiling points, which render them unsuitable for dielectric use under extreme temperature conditions.

Carbon tetrachloride cannot be employed advantageously because of its low boiling point, high volatility, instability in the presence of moisture and/or light, and the corrosive nature of the decomposition products resulting therefrom. Halogenated aromatic derivatives such as the chlorinated diphenyls, diphenyloxides, benzenes, etc., have good dielectric properties but have relatively high freezing points, decompose into acid products in the presence of light or water, and are frequently very viscous.

Certain halogenated unsaturated hydrocarbons, such as chlorinated lower olefines, have been found superior for some uses, in that they are less liable to decomposition with formation of corrosive impurities. For example, tetrachloroethlene has been used as a constituent for transformer oils, snuffing compounds, and insulating liquids generally. While this compound is fairly stable, it freezes at approximately −19° C., boils at 120.8° C., and is quite volatile. This combination of characteristics renders this compound unsuitable for general use, since temperatures in excess of 120° C. and below −19° C. are frequently encountered in situations wherein electrical devices containing organic dielectric materials are employed.

We have discovered that chloro-olefin compounds containing 3 or more carbon atoms, and in which all of the hydrogen has been replaced by chlorine, are much superior to the above mentioned compounds and materials for general dielectric use. These compounds, having boiling points in excess of 200° C., are not readily volatile. They have low pour-points, low viscosities, and are non-flammable. Such characteristics in combination with good solvent powers and high dielectric properties make these compounds valuable, not only when used alone as dielectrics, but also as addition agents to serve as pour-point depressants, snuffer compounds, and general diluents for other dielectrics.

Hexachloropropylene is a particular example of a compound of this class, which is well adapted for general dielectric use. This compound has been reported in the literature as being a liquid boiling at 209°–210° C. and having a specific gravity of 1.7652 at 20°/4° C. We have discovered, furthermore, that this compound has a surprisingly low freezing point below −80° C. and a pour point below −40° C., which characteristics are entirely unexpected in view of the molecular weight and highly chlorinated nature of the compound and the corresponding values for related polychloro compounds, such as tetrachloroethylene and carbon tetrachloride. We have further found that hexachloropropylene is resistant to decomposition by light and moisture, and has substantially no corrosive effect upon the metallic parts of electrical apparatus with which it may come in contact. The use of this compound as a transformer oil or for similar purposes is especially advantageous in situations where the electrical apparatus is exposed to wide variations in temperature, more particularly to very low temperatures.

Other completely chlorinated olefins having three or more carbon atoms are similarly adapted for dielectric purposes, as well as mixtures of the same. Likewise, such compounds and mixtures may be advantageously used in combination with known dielectric liquids to improve the properties of the latter.

The following examples are illustrative of certain compositons comprised within the scope of our invention, but are not to be construed as limiting the same.

*Example 1*

A dielectric composition was prepared consisting essentially of hexachloropropylene by reacting chloroform with tetrachloroethylene in the presence of aluminum chloride to form heptachloropropane, which was then treated with alcoholic sodium hydroxide solution to split off hydrogen chloride therefrom and form hexachloropropylene. The resulting product was washed with water to remove traces of inorganic salt therefrom, and dried, whereby there was obtained a liquid product containing approximately 85.5 per cent by weight of chlorine, having a specific gravity of 1.755 at 20°/4° C., a freezing point of less than —80° C., a pour-point of below —40° C., and a viscosity of 34 Saybolt seconds at 20° C. This product had a dielectric constant of 2.47, a power factor of less than 0.06 per cent at 1000 cycles at 25° C., a resistivity of over $7 \times 10^{11}$ ohms per centimeter cube at 500 volts D. C., and a break-down potential of 29,000 volts at 25° C. when tested in a 0.1" disc electrode gap.

*Example 2*

40 parts by weight of hexachloropropylene, and 60 parts by weight of hexachloro-diphenyl oxide having a viscosity of 620 Saybolt seconds at 50° C., and a pour-point of 20° C., were mixed together and contacted with 1 per cent by weight of activated charcoal (Ph 10) at a temperature of approximately 100°–110° C., for 30 minutes, whereby the tendency of the hexachloro-diphenyl oxide present in the mixture to undergo acid decomposition was materially reduced. The charcoal was removed therefrom and the resulting liquid found to have a viscosity of 50 Saybolt seconds at 50° C., a pour-point of —39° C., a dielectric constant of 3.50, a power factor of less than 0.06 per cent at 1000 cycles at 25° C., and a resistivity of over $7 \times 10^{11}$ ohms per centimeter cube at 500 volts D. C.

*Example 3*

A mixture of polychloro-hydrocarbons was prepared, containing essentially

| | Per cent by weight |
|---|---|
| Heptachloropropane | 50 |
| Hexachloropropane | 30 |
| Hexachloroethane and other polychloro-hydrocarbons | 20 | having a specific gravity of 1.776 at 20°/4° C., boiling between 60° C. and 130° C. at 22 millimeters pressure, and containing 84.3 per cent by weight chlorine. This mixture was treated with an alcoholic sodium hydroxide solution at a temperature of approximately 80° C. to split out HCl therefrom whereby there was obtained a mixture comprising a substantial proportion of the polychloro-olefins. This crude product was washed with water to remove alcohol and inorganic salt therefrom, and dried, whereby there was obtained a straw-colored liquid product having the following approximate composition:

| | Per cent by weight |
|---|---|
| Hexachloropropylene | 45–55 |
| Pentachloropropylene | 20–30 |
| Hexachloroethane and other highly chlorinated hydrocarbons | 35–15 |

This mixture contained 87.6 per cent by weight of chlorine, had a specific gravity of 1.768, a viscosity of 35 Saybolt seconds at 50° C., a freezing point of below —40° C., a pour-point of below —40° C., a dielectric constant of 2.91, a power factor of less than 0.06 per cent at 1000 cycles at 25° C., a resistivity of over $7 \times 10^{11}$ ohms per centimeter cube at 500 volts D. C., and a break-down potential of approximately 31,000 volts at 25° C. when tested in a 0.1" disc electrode gap. The above dielectric composition is hereinafter referred to as a poly-chloropropylene fraction.

Modification in the composition of the polychloro-hydrocarbon mixture as above employed in the preparation of the polychloropropylene fraction results in the formation of dielectric compositions containing other proportions of hexachloropropylene, etc. When other polychloro-paraffins such as nonachloro-butane, etc., are incorporated therein olefin compound such as octachloro-butylenes, may be obtained as constituents of the product obtained thereby.

*Example 4*

The above poly-chloropropylene fraction was distilled and found to boil between 60° and 125° C. at 22 millimeters pressure. The distillate so obtained was a water-white liquid containing 85.8 per cent chlorine, having a specific gravity of 1.764, a viscosity of 35 Saybolt seconds at 50° C., and a pour-point of below —40° C. A mixture of 67 per cent by weight of this distilled product and 33 per cent by weight of hexachloro-diphenyl oxide had a viscosity of 43 Saybolt seconds at 50° C. and a pour-point below —40° C. This composition was found to have a dielectric constant of 3.53, a power factor of less than 0.06 per cent at 1000 cycles at 25° C., and a resistivity of over $7 \times 10^{11}$ ohms per centimeter cube at 500 volts D. C.

*Example 5*

A dielectric composition containing 25 per cent by weight of an undistilled poly-chloropropylene fraction obtained substantially as described in Example 3, and 75 per cent by weight of hexachloro-diphenyl oxide was found to have a viscosity of 120 Saybolt seconds at 50° C., a pour-point of —12° C., a dielectric constant of 3.86, a power factor of less than 0.06 per cent at 1000 cycles at 25° C., and a resistivity of over $7 \times 10^{11}$ ohms per centimeter cube at 500 volts D. C.

*Example 6*

40 parts of the undistilled poly-chloropropylene fraction, and 60 parts of pentachloro-diphenyl, having a viscosity of 410 Saybolt seconds at 50° C., and a pour-point of 14° C. were mixed together, whereby there was obtained a free-flowing liquid composition. This product had a viscosity of 46 Saybolt seconds at 50° C., a pour-point of below —38° C., a dielectric constant of 3.86, a power factor of 0.26 per cent at 1000 cycles at 25° C., a resistivity of $9.8 \times 10^{10}$ ohms per centimeter cube at 500 volts D. C., and a break-down potential of 31,000 volts at 25° C. when tested in a 0.1" disc electrode gap.

The pour-points given in the above examples were determined by the standard methods adopted by the American Society for Testing Materials. In certain instances the exact pour-points of compositions have not been determined because of the difficulties involved in conducting the test at extremely low temperatures. These values are stated as being below some conveniently determined temperature, as —40° C.

By substituting other known dielectric materials for hexachloroethane, hexachloro-diphenyl oxide, pentachloro-diphenyl, etc., in the examples, other valuable dielectric mixtures comprising the described poly-chlorinated olefins may be obtained. Any inert organic derivative compatible with said olefin derivatives and having a break-down potential of 25,000 volts or higher at 25° C. when tested in a 0.1" disc electrode gap, may be so employed. Representative of such products are diphenyl and its halogenated derivatives, and particularly chlorinated diphenyls containing up to 8 chlorine atoms; diphenyloxide and its halogenated derivatives, and particularly chlorinated derivatives thereof containing up to 8 chlorine atoms; poly-chlorinated aliphatic hydrocarbons such as tetrachloroethylene, tri-chloro-ethylene, hexachloro-propane, etc.; various petroleum distillates; and halo-aromatic derivatives generally, such as trichloro-benzene, tetrachloro-benzene, the chloro-naphthalenes, chloro-styrene, chloro-divinyl-benzenes, etc. While the examples show concentrations of hexachloro-propylene ranging from 25 to 75 per cent by weight in such mixed compositions, it is to be understood that any desired proportions of this compound, octachloro-butylene, and similar chloro-olefin compounds, or mixtures of the same, may be employed with known dielectric materials.

The above-described compositions are also valuable as fire-proofing agents and preservatives in the treatment of textiles and cellulosic products, as insecticides.

Other modes of applying the principles of our invention may be employed instead of those explained, change being made as regards the materials or their amounts employed, provided the ingredients stated by any of the following claims or their equivalent be employed.

We therefore particularly point out and distinctly claim as our invention:—

1. The method of preventing current leakage and flow between conducting elements which consists in interposing between the elements a dielectric material comprising a substantial proportion of a liquid chloro-olefine compound containing at least 3 carbon atoms and in which all of the hydrogen has been replaced by chlorine.

2. The method of preventing current leakage and flow between conducting elements which consists in interposing between the elements a dielectric material comprising a substantial proportion of hexachloro-propylene.

3. The method of preventing current leakage and flow between conducting elements which consists in interposing between the elements a dielectric material comprising a substantial proportion of a liquid chloro-olefine compound containing at least 3 carbon atoms and in which all of the hydrogen has been replaced by chlorine, said chloro-olefine having a boiling point in excess of 200° C.

4. The method of preventing current leakage and flow between conducting elements which consists in interposing between the elements a dielectric material comprising a substantial proportion of hexachloro-propylene, said compound having a boiling point of approximately 210° C., a pour point of below —40° C., and a freezing point below —80° C.

EDGAR C. BRITTON.
GERALD H. COLEMAN.
LUTHER F. BERHENKE.